United States Patent
Nakil et al.

(10) Patent No.: US 7,406,567 B1
(45) Date of Patent: Jul. 29, 2008

(54) ALGORITHM TO IMPROVE PACKET PROCESSING PERFORMANCE USING EXISTING CACHING SCHEMES

(75) Inventors: Harshad Nakil, San Jose, CA (US); Rajashekar Reddy, Santa Clara, CA (US); Hampapur Ajay, San Jose, CA (US); Nipa Kumar, Santa Clara, CA (US); Radesh Manian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1107 days.

(21) Appl. No.: 10/291,894

(22) Filed: Nov. 8, 2002

(51) Int. Cl.
   *G06F 12/00* (2006.01)
(52) U.S. Cl. .................. 711/133; 711/202; 711/203
(58) Field of Classification Search .................. 711/133, 711/202, 203
   See application file for complete search history.

(56) References Cited

U.S. PATENT DOCUMENTS 5,761,722 A * 6/1998 Vishin et al. ................ 711/141
6,182,164 B1 * 1/2001 Williams ..................... 710/15
6,324,595 B1 * 11/2001 Tsai et al. .................... 710/15
2003/0135847 A1 * 7/2003 Gouriou et al. ............. 717/158

OTHER PUBLICATIONS

Cisco Systems, Inc., "Cisco 7200 Series Router Architecture", 15 pages, retrieved from the Internet on May 7, 2003: <URL:http://ww.cisco.com/warp/public/63/arch_7200_5810.shtml>.

* cited by examiner

*Primary Examiner*—Gary J Portka
*Assistant Examiner*—Yong J. Choe
(74) *Attorney, Agent, or Firm*—Charles E. Krueger

(57) ABSTRACT

A system and method for improving the speed of packet switching in a routing platform that maps shared I/O memory into two address spaces. The first address space is mapped with the cache attribute and uses the cache write through attribute. Addresses in this address space are not equal to the physical address in the shared I/O memory and are translated to the physical addresses. Code executed by the CPU to switch packets utilizes the first address space to access packet data. The second address space is mapped with the non-cache attribute and addresses in this space are equal to the physical addresses in the shared I/O memory. The second address space is utilized by I/O devices when accessing shared I/O memory. Addresses of buffers for storing packet data in the shared I/O memory are converted from the first address space to the second address space when given to I/O devices.

7 Claims, 4 Drawing Sheets

ALGORITHM TO IMPROVE PACKET PROCESSING PERFORMANCE USING EXISTING CACHING SCHEMES

BACKGROUND OF THE INVENTION

Typically on routers and other networking devices the memory (DRAM) is logically divided into two parts. The first part is the Main Processor Memory, referred to in the following as PMEM, which is the part of the memory that is accessed only by the CPU. The second part is Shared I/O Memory which is accessed by both the CPU and I/O Devices.

The PMEM is used by program TEXT, DATA, BSS, HEAP and STACK. The routing tables, route caches, configurations, etc., will fall into PMEM. Since PMEM is accessed ONLY by the CPU, it is mapped using the CACHE attribute which means that when a memory location in this space is accessed the corresponding line is brought into the cache so that subsequent accesses to that memory location are made from the cache. Cache is a small fast memory located closer to the CPU than the main memory. The accesses to the cache are an order of magnitude faster than the accesses to the main memory. The PMEM is cached with the write-back attribute which means that whenever some modification is made to this memory location by the CPU the change is reflected only in the cache and not in the main memory. The memory is updated only when this cache line in the cache needs to be replaced. The main point to note here is that cacheable memory accesses are much faster than the non-cacheable memory accesses.

I/O Memory, referred to in the following as IOMEM, is the part of the memory that is shared by the CPU and other I/O devices, such as the Network Controllers, and is used by I/O Devices for storage of incoming packets and by the CPU for placing outgoing packets, packet data buffers, particle data buffers, and device control structures (descriptors, address tables, etc.) reside in IOMEM. Packets received on the network interfaces are placed in IOMEM by the I/O devices to be picked up and processed by the CPU. After the processing is done, CPU will place the packets in the IOMEM to be picked up and transmitted by the I/O devices.

Since IOMEM is shared by multiple memory masters, it is mapped with the NON-CACHABLE attribute. That means that any access to this part of the memory goes all the way to the memory and nothing is brought into cache. This is done to preserve coherency of the memory. If IOMEM is made cachable and brought into cache by the CPU, updates made by the CPU will not be made to the memory and thus will not be seen by the I/O devices.

As part of packet processing the CPU will perform multiple accesses to the packet data which lies in IOMEM. These accesses are to: 1) decode the encapsulation; 2) read the Layer 3 addresses; and 3) do other things needed to route the packet.

Since these CPU accesses to IOMEM are all Non-Cached accesses, they are a major performance bottleneck because, as described above, Non-Cached accesses are an order of magnitude slower than Cached accesses.

BRIEF SUMMARY OF THE INVENTION

In one embodiment of the invention, a scheme is developed where accesses to the packet data are made cached while preserving memory coherency giving a performance boost in packet processing.

In another embodiment of the invention, shared I/O memory is mapped into two address spaces. The first being cached with the write-through attribute set and the second being uncached.

In another embodiment of the invention, the address space has the virtual addresses equal to the physical addresses and is used by I/O devices to access packets from the shared I/O memory.

In another embodiment of the invention, the CPU uses the first address space to access and store packets during fast switching. The setting of the writethrough attribute assures coherency between the I/O memory and the cache.

In another embodiment of the invention, the CPU invalidates cache lines corresponding to address where an accessed packet is stored to preserve coherency.

Other features and advantages will be apparent in view of the following detailed description and appended drawings.

DETAILED DESCRIPTION OF THE INVENTION

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks. In the following, embodiments will be described, by way of example, not limitation, that operate on routing platforms designed and manufactured by the assignee of the present patent application. However, it is understood by persons of skill in the art that the invention has broad utility in any routing platform.

An embodiment of the invention will now be described that provides for cached IOMEM accesses only by the CPU, non-cached IOMEM accesses by I/O devices, and that prevents loss of cache coherency with the IOMEM. The embodiment is implemented by software utilizing standard microprocessor hardware.

Before describing the first embodiment, the environment in which the, embodiment operates will be briefly described. Generally a routing platform includes a chassis, which contains basic components such as power a supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a router can be configured to work with a variety of networking protocols.

The basic function of a routing platform is routing, or forwarding, which consists of the operation of transferring a packet from an input interface to an output interface. The routing, or forwarding, function comprises two interrelated processes to move information in the network, i.e., making a routing decision by routing and moving packets to the nexthop destination by switching. Many routing platforms perform both routing and switching, and there are several types of each.

Figure 1:
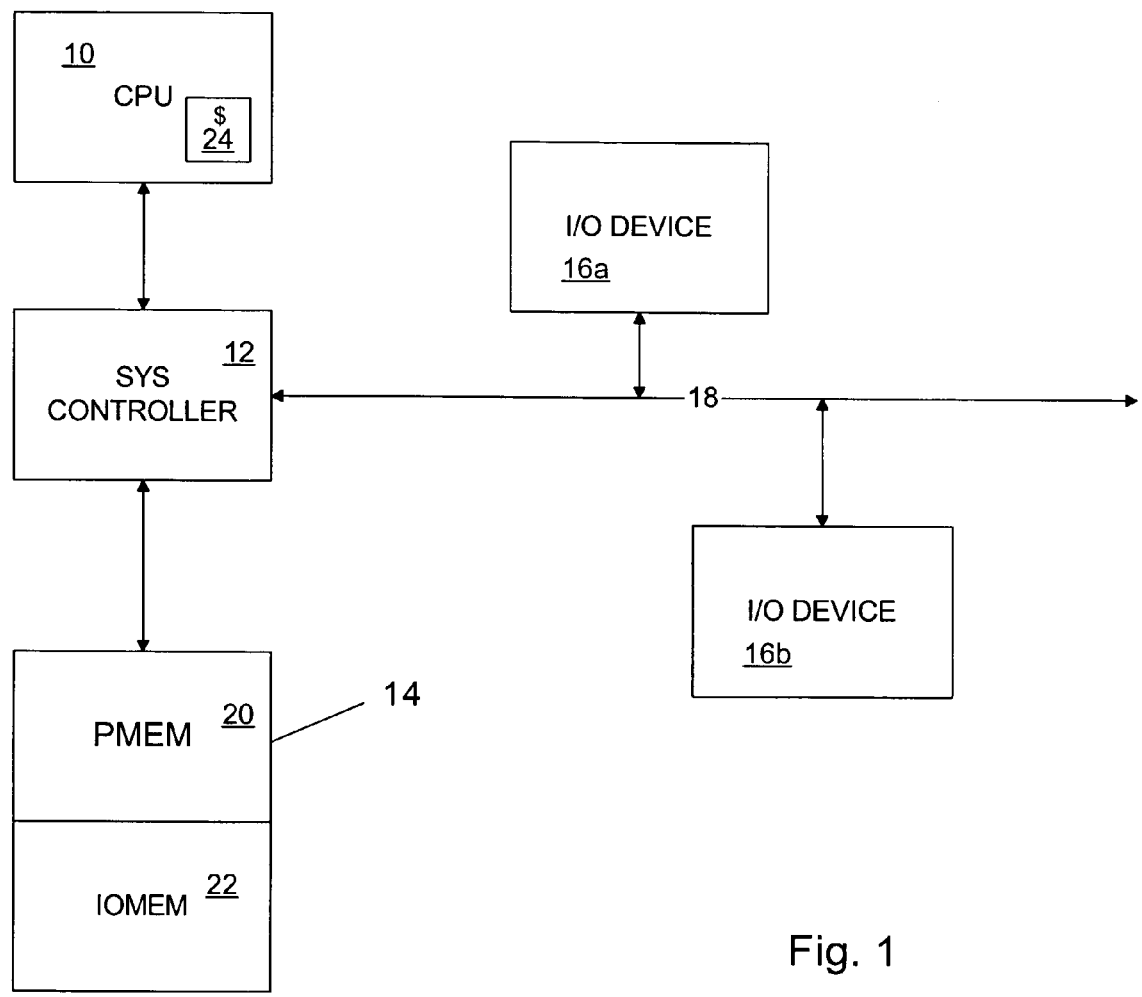
FIG. 1 is a block diagram of system in which an embodiment of the invention is implemented.

In FIG. 1, a system for implementing an embodiment of the invention is depicted. The figure depicts a typical routing platform bus architecture including a CPU 10, a System Controller. 12, a memory for storing program code and data including DRAM memory 14, and various I/O devices 16. The I/O devices and System Controller are connected by an I/O bus 18.

The DRAM 14 includes the working storage 20 utilized by the CPU (PMEM) and the shared storage 22 dedicated to handling the router's packet buffer (IOMEM). The packet buffers, particles, descriptor rings etc., reside in IOMEM.

In this embodiment a data cache 24 is located on the CPU and is used to cache data during accesses to the addresses from an address space having the cache attribute set.

Thus, FIG. 1 depicts how the DRAM 14 is logically divided into Main Processor memory (PMEM) 20 and shared I/O memory (IOMEM) 22. In this embodiment of the invention, when the IOMEM is cached it is cached with a cache write through attribute and every cache write utilizes the Cache Write Through Algorithm (CWT).

Figure 2:
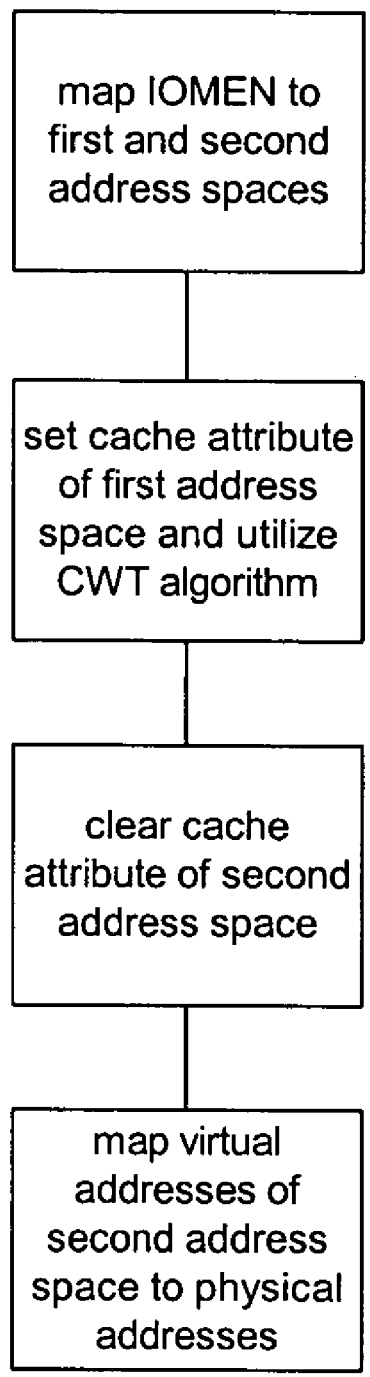
FIG. 2 is a flowchart depicting the steps of mapping IOMEM to two virtual address spaces.

The mapping of IOMEM will now be described with reference to the flowchart of FIG. 2. The CWT is implemented as follows: 1) whenever there is a read or write access to a storage location in memory the corresponding cache line that includes the storage location is brought into the cache; and 2) whenever data stored in the storage location is modified, the corresponding storage location in the cache, as well as in the memory, is modified (Write Through). Thus, coherency between IOMEM and the cache is always maintained.

Figure 3:
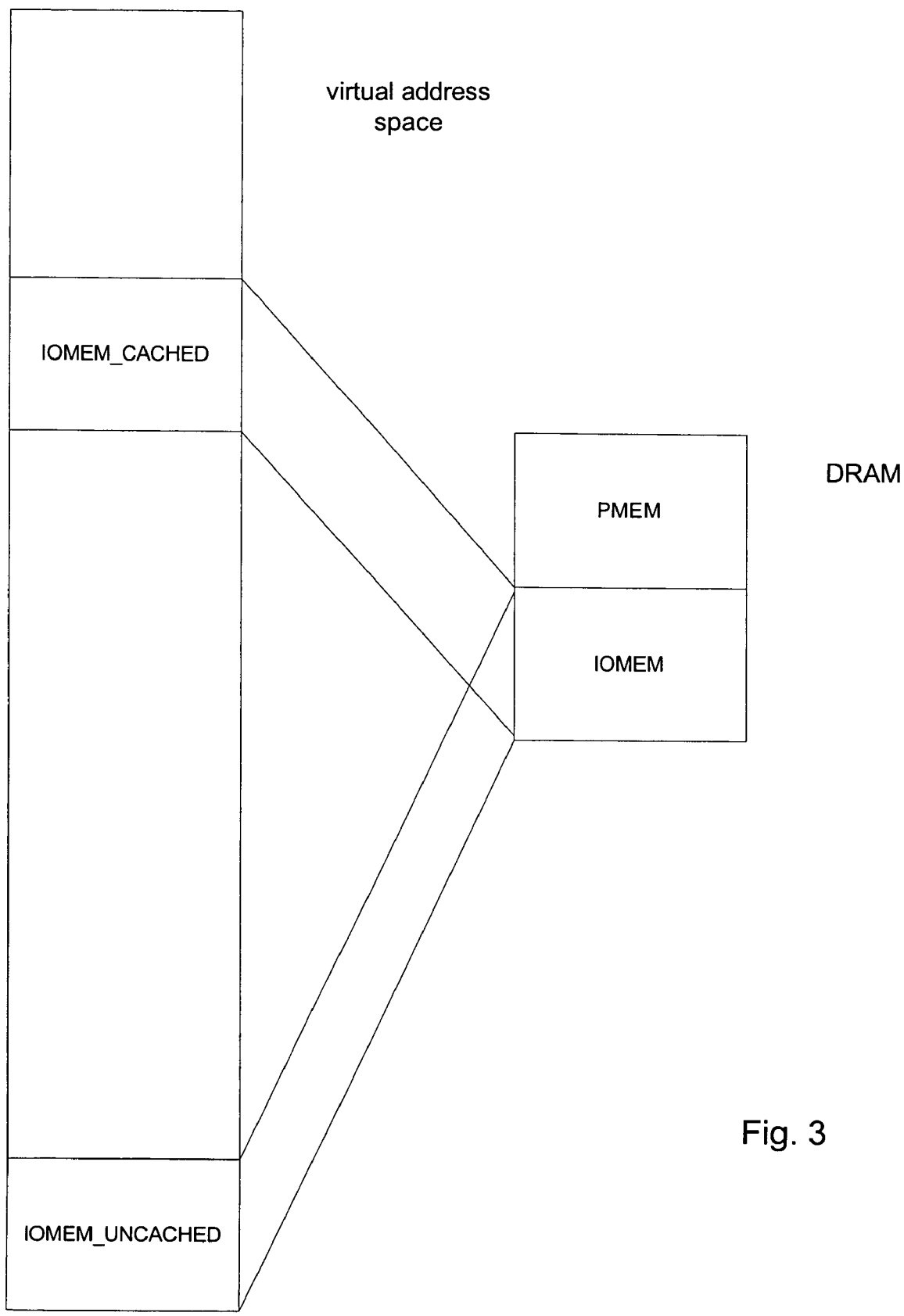
FIG. 3 is a block diagram depicting the cached and uncached address spaces mapped to the shared I/O memory.

As depicted in FIG. 3, the IOMEM is mapped into two address spaces, one cached and other uncached. The first address space is designated the IOMEM_CACHED Space. In the first address space, all accesses to IOMEM are CACHED so that a first access is from the IOMEM and subsequent accesses are from the faster cache memory. The CPU uses this first address space to access Packet Data stored in buffers in IOMEM. The second address space is designated as the IOMEM_UNCACHED Space. In the second address space all accesses to IOMEM are NON-CACHED. This second address space is used when addresses need to be given to the I/O devices.

In one embodiment the following mappings are utilized for the first and second address spaces: IOMEM_CACHED virtual address=(Physical Addr 0×40000000); and IOMEM_UNCACHED virtual address=(Physical Addr).

Thus, in this embodiment, addresses in the first and second address spaces differ by the value of the MSB. Addresses in the first address space require translation and are mapped with the CACHE attribute. Since data accesses by the CPU will be cached subsequent accesses to the same data from the cache will not encounter memory access latency thereby removing a significant performance penalty and increasing the packet processing speed.

The I/O Devices access the memory using the physical address and hence the IOMEM_UNCACHED virtual addresses are made equal to the physical address.

In this embodiment, when the operating system (OS) allocates buffers in IOMEM the IOMEM_CACHED addresses are returned.

Figure 4:
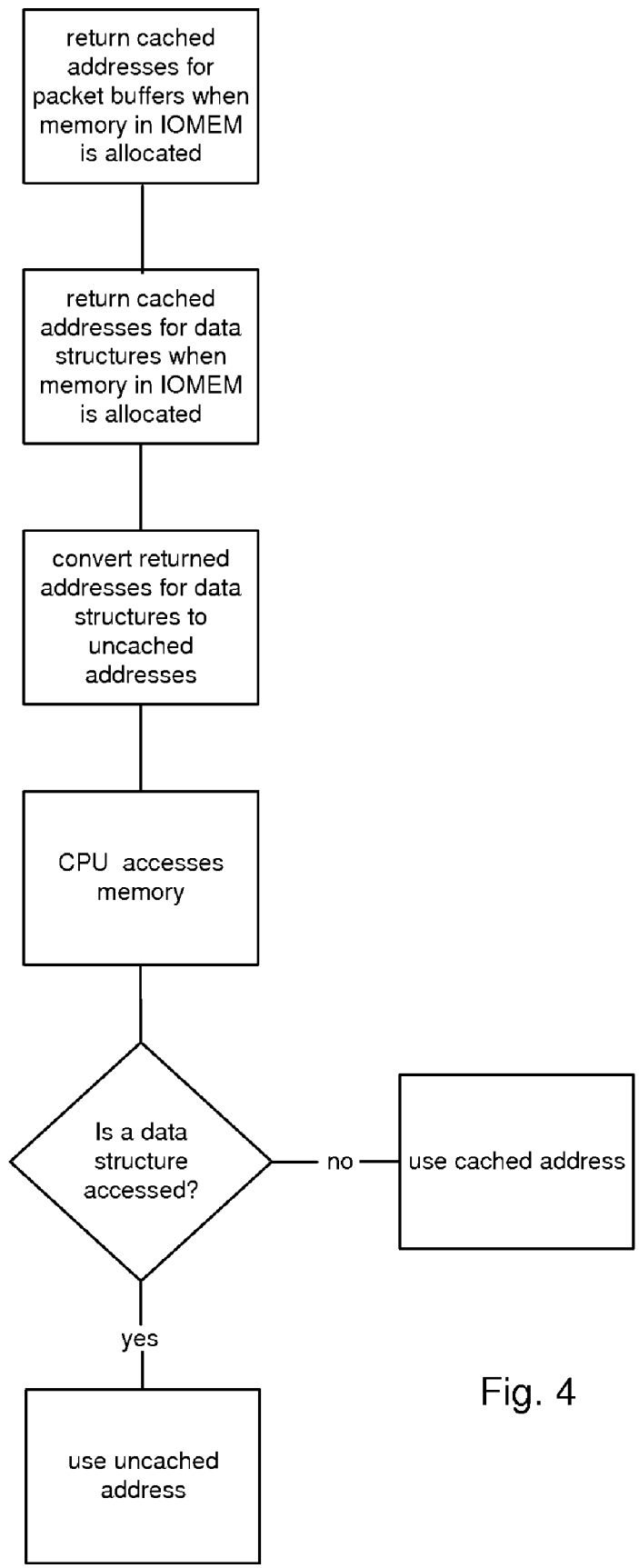
FIG. 4 is a flowchart depicting the steps of CPU accessing of IOMEM.

The accessing of IOMEM by the CPU will now be described with reference to the flowchart of FIG. 4. For IOS® operating system, the IOMEM_CACHED space is reported as IOMEM during initialization. Now all mallocs to IOMEM will return addresses in the IOMEM_CACHED space. Hence the pointers to the buffers in packets and particles are all addresses from IOMEM_CACHED space.

The common code used by the operating system and executed by the CPU (process switching code, fast switching code, CEF switching code, etc.) will always access the particles and buffers using addresses form the IOMEM_CACHED address space. When the CPU executes fast switching code (for example) it uses the IOMEM_CACHED addresses so that data is cached for fast access.

The above IOMEM_CACHED scheme is only used for data buffers, all the other data structures shared by the processor and the I/O devices, e.g., descriptors, address filter tables, etc. that reside in the IOMEM space are accessed by the processor using IOMEM_UNCACHED space. When these non-buffer data structures are allocated at initialization, the IOS® operating system returns a cached address from the IOMEM_CACHED space and the device driver then converts this address to an IOMEM_UNCACHED address and stores it in the driver's local structure. From that point on, all accesses to this memory storing non-buffer data structures would be through the uncached address except the call to free this memory. Before a call to free this memory is made, this address is converted back to IOMEM_CACHED address, as all mallocs and frees use IOMEM_CACHED address space.

When the CPU has a packet for transmission, the buffer addresses in the packet will be IOMEM_CACHED addresses. Since, the I/O Devices use IOMEM_UNCACHED addresses, a conversion needs to be done before the packets are given to the I/O Devices for transmission. In the currently described embodiment, this conversion requires only a flipping of a bit for the addresses that described above. When the CPU gives empty buffers to the I/O Devices for receiving packets, the same conversion from IOMEM_CACHED to IOMEM_UNCACHED is required.

During the reception of a packet, the I/O device that receives the packet may be allocated a buffer at an IOMEM location that may have been cached previously by the CPU. If the CPU were to read these IOMEM locations it would access stale data from the cache and not the new data stored by the I/O Device. Accordingly, when the CPU needs to pick up the received packet data, it invalidates all the cache lines corresponding to the memory locations of the received packet. Once the invalidation is done, the access to the packet data goes to the memory and fetches the new data stored by the I/O Device. The technique for invalidating the cache lines is platform dependent and utilizes an instruction specific to the CPU being utilized.

There is no need for cache invalidations or cache flushes during transmission because IOMEM_CACHED is mapped with a WriteThrough attribute so that as soon as the packet data is modified in the cache the modification is reflected in the memory.

The invention may be implemented as program code, stored on a computer readable medium, that is executed by a digital computer. The computer readable medium may include, among other things, magnetic media, optical media, and so on.

The invention has now been described with reference to specific embodiments. Alternatives and substitutions will now be apparent to persons of ordinary skill in the art. For example, the particular memory mapping described is not critical to the invention. Accordingly, it is not intended to limit the invention except as provided by the appended claims.

What is claimed is:

1. A method comprising:
   mapping a shared memory into first and second virtual address spaces, with the shared memory holding buffer data structures and non-buffer data structures, with the buffer data structures and non-buffer data structures shared between Input/Output (I/O) devices which send and receive packets and a Central Processing Unit (CPU);

setting a cache attribute for the first virtual address space and utilizing the cache write through algorithm when writing cached data with addresses in the first virtual address space, where the first virtual address space is utilized only by the CPU and the CPU utilizes addresses in the first virtual address space to access only buffer data structures;

reporting addresses in the first virtual address space to code executed by the CPU which implements switching;

returning pointers to buffer data structures, which store packet data, where pointers returned point to addresses in the first virtual address space when allocating memory;

setting a non-cache attribute for the second virtual address space, where non-buffer data structures held in the shared memory are accessed utilizing addresses in the second address space;

converting a returned pointer to a buffer data structure from a pointer to an address in the first virtual address space to a converted pointer to a corresponding address in the second virtual address space prior to passing the pointer from the CPU to an I/O device;

at the I/O device, using the converted pointer to access packet data stored in a buffer data structure in the shared memory; and at the CPU, invalidating the cache lines corresponding to the addresses of a received packet before accessing data in the received packet.

2. The method of claim 1 further comprising the step of:
using physical addresses of the shared I/O memory in the second virtual address space.

3. The method of claim 1 further comprising the step of:
mapping the first virtual address space so that only a most significant bit is different from the physical address.

4. The method of claim 3 where said step of converting comprises the step of:
changing a bit value of the most significant bit in the address pointed to by the return pointer.

5. The method of claim 1 further comprising the steps of:
converting pointers returned to addresses of non-buffer data structures in the first virtual address space in shared I/O memory to converted pointers to corresponding addresses in the second virtual address space; and utilizing the converted pointers at the CPU to access said non-buffer data structures.

6. One or more computer readable storage media encoded with software comprising computer executable instructions and when the software is executed operable to:

map a shared to memory into first and second virtual address spaces, with the shared memory including buffer data structures and non-buffer data structures, with the buffer data structures and non-buffer data structures shared between Input/Output (I/O) devices which send and receive packets and a Central Processing Unit (CPU);

set a cache attribute for the first virtual address space and utilize the cache write through algorithm when writing cached data with addresses in the first virtual address space, where the first virtual address space and utilize the cache write through algorithm when writing cached data with addresses int he first virtual address space, where the first virtual address space is utilized only by the CPU and the CPU utilizes addresses int he first virtual address space to access only buffer data structures;

report addresses in the first virtual address space to code executed by the CPU which implements switching;

return pointers to buffer data structures, which store packet data, where pointers returned point to addresses in the first virtual address space when allocating memory;

set a non-cache attribute for the second virtual address space, where non-buffer data structures held in the shared memory are accessed utilizing addresses in the second virtual address space;

convert a returned pointer to a buffer data structure from a pointer to an address in the first virtual address space to a converted pointer to a corresponding address in the second virtual address space prior to passing the pointer from the CPU to an I/O device;

cause said I/O device to use the converted pointer to access packet data stored in a buffer data structure in the shared memory; and cause the CPU to invalidate cache lines corresponding to the addresses of a received packet before accessing data in the received packet.

7. The computer readable storage media of claim 6 encoded with software when executed further operable to:
use physical addresses of the shared I/O memory in the second virtual address space.

* * * * *